United States Patent
Hanawa et al.

(10) Patent No.: US 6,889,670 B2
(45) Date of Patent: May 10, 2005

(54) ENGINE FUEL INJECTION APPARATUS

(75) Inventors: Kaoru Hanawa, Saitama (JP); Hiroya Ueda, Saitama (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 10/627,766

(22) Filed: Jul. 28, 2003

(65) Prior Publication Data

US 2004/0094135 A1 May 20, 2004

(30) Foreign Application Priority Data

Jul. 31, 2002 (JP) ....................................... 2002-223715

(51) Int. Cl.[7] .............................................. F02M 23/00
(52) U.S. Cl. ...................................... 123/533; 123/470
(58) Field of Search ............................... 123/468, 469, 123/470, 531, 532, 533, 534

(56) References Cited

U.S. PATENT DOCUMENTS

| 5,233,952 A | | 8/1993 | Isaka | |
|---|---|---|---|---|
| 5,622,155 A | * | 4/1997 | Ellwood et al. | 123/531 |
| 5,657,733 A | * | 8/1997 | Dozier et al. | 123/470 |
| 5,682,859 A | * | 11/1997 | Wakeman | 123/470 |
| 6,161,527 A | * | 12/2000 | Ruman | 123/533 |
| 6,626,160 B2 | * | 9/2003 | Liedtke et al. | 123/531 |

OTHER PUBLICATIONS

Abstracts of Japan for JP 04081571 A, Mar. 16, 1992.

* cited by examiner

*Primary Examiner*—Erick Solis
(74) *Attorney, Agent, or Firm*—Birch, Stewart, Kolasch & Birch, LLP

(57) ABSTRACT

In an engine fuel injection apparatus including an injector having a fuel injection valve for injecting fuel and an air fuel injection valve that is mounted to a cylinder head so as to inject fuel directly into a combustion chamber with compressed air an increase in the size of the engine and the complexity of the structure around the engine are avoided and the pumping efficiency of a compressed air pump is improved. At least part of the compressed air supply route for supplying compressed air to the injector is provided directly in the cylinder head while passing the area in the vicinity of an exhaust port.

17 Claims, 8 Drawing Sheets

ENGINE FUEL INJECTION APPARATUS

CROSS-REFERENCE TO RELATED APPLICATIONS

The present application claims priority under 35 USC 119 to Japanese Patent Application No. 2002-223715 filed on Jul. 31, 2002 the entire contents thereof are hereby incorporated by reference.

BACKGROUND OF THE INVENTION

1. Field of the Invention

The present invention relates to an engine fuel injection apparatus including an injector having a fuel injection valve for injecting fuel and an air fuel injection valve that is mounted to a cylinder head so as to inject fuel directly into a combustion chamber with compressed air.

2. Description of Background Art

In the related art, such a fuel injection apparatus is known in JP-A-2820782.

However, the apparatus in the related art described above is constructed in such a manner that a compressed air pump and an injector are connected by a duct line separate from a cylinder head, which may result not only in an increase in the size of the engine and the complexity of the structure around the engine, but also in a lowering of the pumping efficiency because the volume of compressed air decreases by being cooled when passing from the compressed air pump to the injector.

SUMMARY AND OBJECTS OF THE INVENTION

In view of such a circumstances, it is an object of the present invention to provide an engine fuel injection apparatus in which increase in size of the engine and complexity of the structure around the engine are avoided and pumping efficiency of the compressed air pump is improved.

In order to achieve the aforementioned object, the present invention provides an engine fuel injection apparatus including an injector having a fuel injection valve for injecting fuel and an air fuel injection valve that is mounted to a cylinder head so as to inject fuel directly to a combustion chamber together with compressed air wherein at least part of a compressed air supply route for supplying compressed air to the aforementioned injector is provided directly on the cylinder head so as to pass in close proximity to an exhaust port.

According to the present invention, since at least part of the compressed air supply route is provided directly on the cylinder head, it is not necessary to arrange a component for introducing compressed air to the injector around the cylinder head. Thus, an increase in the size of the engine and the complexity of the structure around the engine may be avoided. In addition, since part of the compressed air supply route passes in proximity to the exhaust port, compressed air flowing in the compressed air supply route may be warmed up by exhaust heat. Thus, the pumping efficiency may be improved by increasing the volume of compressed air.

In order to achieve the above-described object, the present invention provides an engine fuel injection apparatus including an injector having a fuel injection valve for injecting fuel and an air fuel injection valve that is mounted to a cylinder head so as to inject fuel directly to a combustion chamber together with compressed air wherein at least part of the compressed air supply route for supplying the compressed air to the aforementioned injector includes a tubular regulator that passes through the exhaust port and is mounted to the cylinder head and a passage that is directly attached to the aforementioned cylinder head.

According to the construction of the present invention, since at least part of the compressed air supply route is constructed of the tubular regulator passing through the exhaust port and the passage provided directly to the cylinder head, an increase in the size of the engine and the complexity of the structure around the engine may be avoided by not arranging the component for introducing compressed air to the injector around the cylinder head. In addition, since the tubular regulator constituting part of the compressed air supply route passes through the exhaust port, compressed air flowing through the compressed air supply route may be warming up by exhaust heat. Thus, the pumping efficiency may be improved by increasing the volume of compressed air.

The present invention provides a head-side water jacket formed in the cylinder head so as to be arranged between the exhaust port and the cylinder block in the vicinity of the aforementioned exhaust port. Part of the aforementioned compressed air supply route is directly provided on the cylinder head on the side opposite from the aforementioned head-side water jacket with respect to the exhaust port. In this arrangement, cooling by the head-side water jacket may be prevented from affecting compressed air that passes through the compressed air supply route as much as possible. Hence, a high pumping efficiency may be maintained even when the engine is a water-cooled engine.

The present invention provides a compressed air pump to be connected to the aforementioned compressed air supply route disposed on the side of the cylinder block corresponding to the aforementioned exhaust port. With this arrangement, the compressed air pump may be disposed in the space for arranging the engine including the exhaust pipe that is connected to the exhaust port.

The present invention provides a pump case of the aforementioned compressed air pump that is formed integrally with the cylinder block. With this arrangement, the number of the components may be reduced, and simultaneously, an increase in the size of the engine and the complexity of the structure of the engine in the vicinity of the compressed air pump may be avoided.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE PREFERRED EMBODIMENTS

Referring now to the attached drawing, an embodiment of the present invention will be described.

Figure 1:
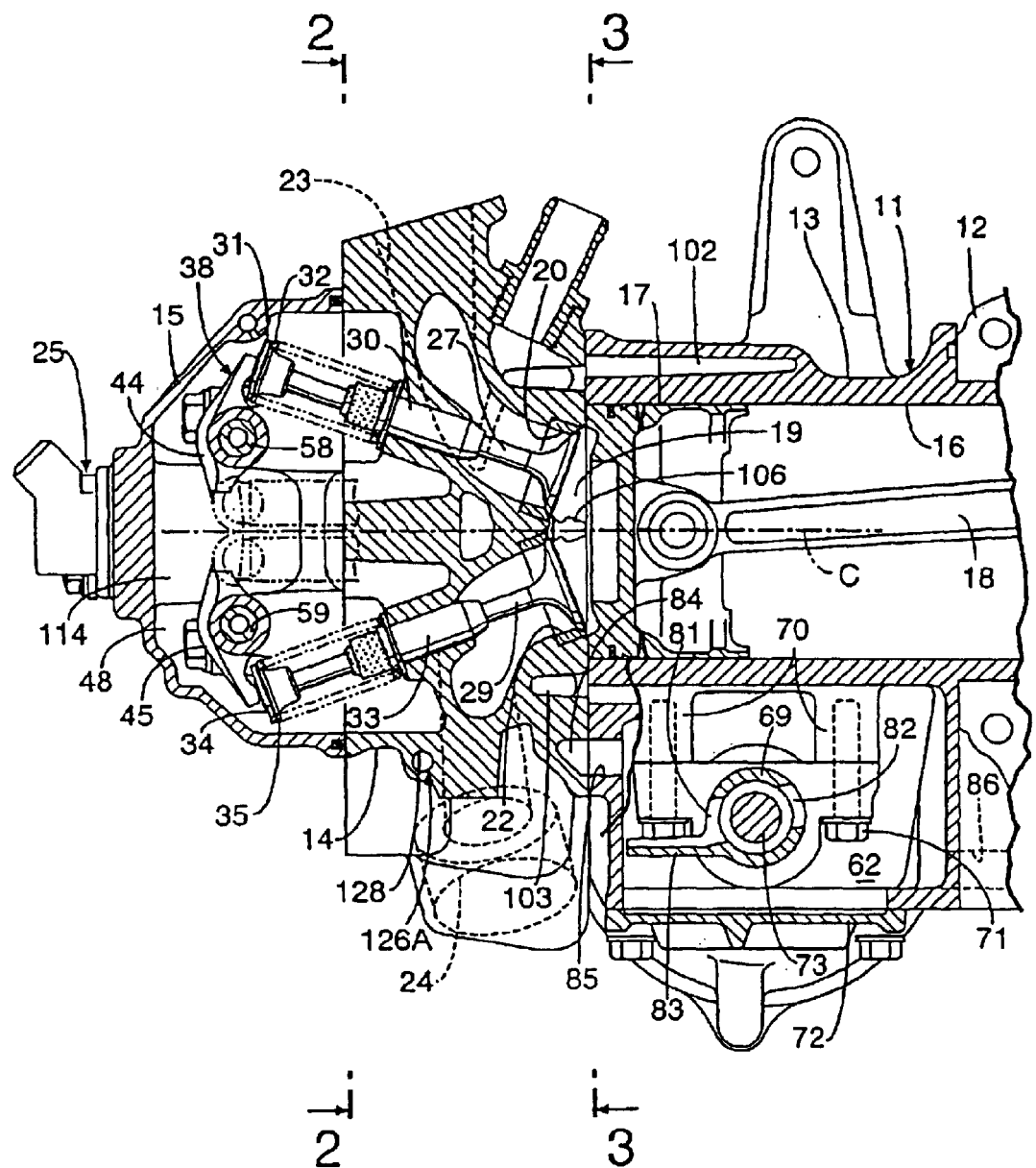
FIG. 1 is a partly vertical cross section of an air-fuel injection four-cycle engine taken along the line 1—1 in FIG. 2.

In FIG. 1, an engine body 11 of the air fuel injection four-cycle engine includes a crankcase 12, a cylinder block 13 connected to the crankcase 12, a cylinder head 14 connected to the cylinder block 13 on the side opposite from the aforementioned crankcase 12, and a head cover 15 to be connected to the cylinder head 14 on the side opposite from the cylinder block 13.

A piston 17 that is slidably fitted into a cylinder bore 16 formed on the aforementioned cylinder block 13 is connected to a crankshaft (not shown) rotatably supported by the crankcase 12 via a connecting rod 18 and a crankpin (not shown). A combustion chamber 19 to which the head of the piston 17 is exposed is formed between the cylinder block 13 and the cylinder head 14.

Figure 2:
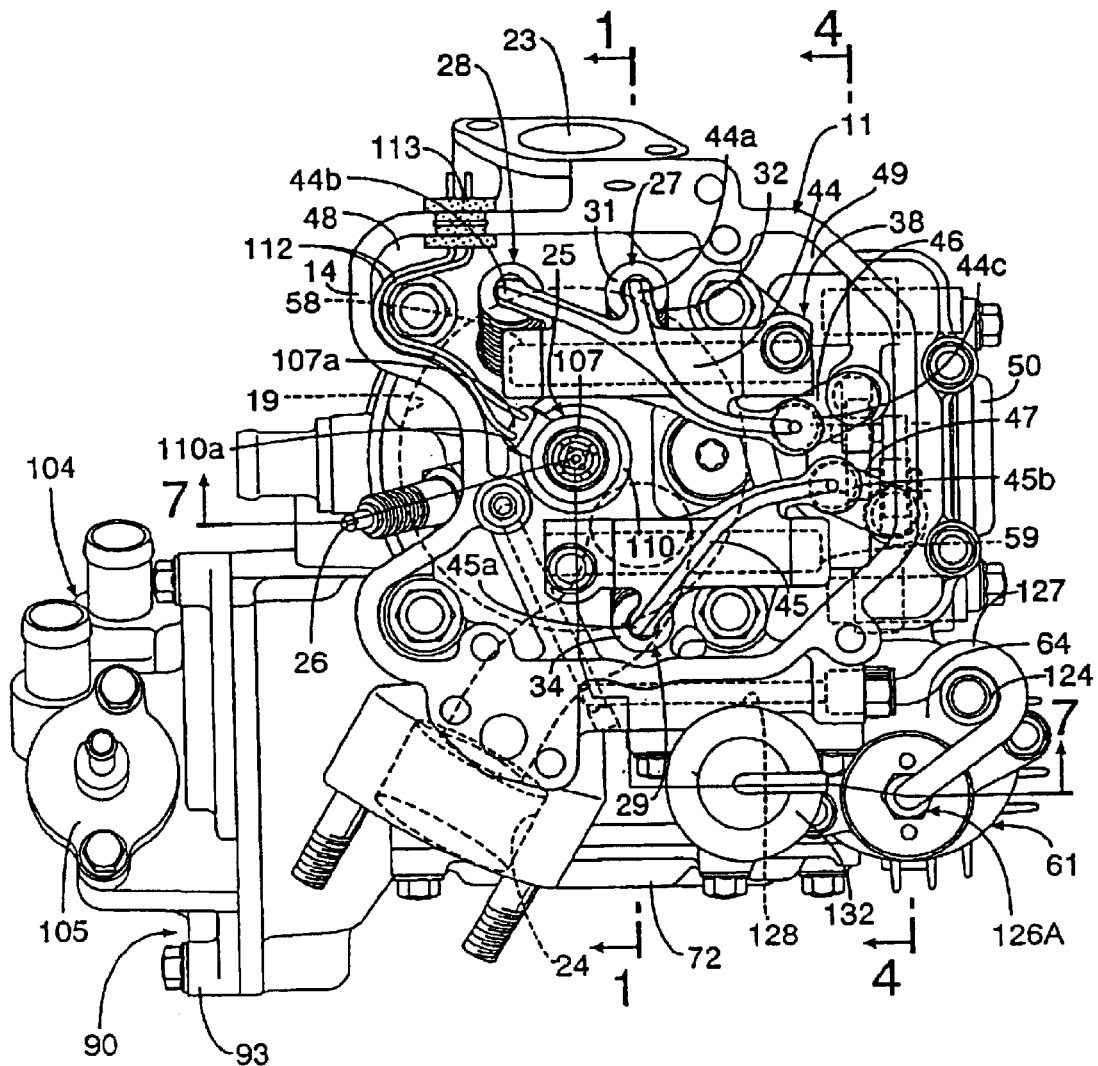
FIG. 2 is a cross sectional view taken along the line 2—2 in FIG. 1 showing a state in which a head cover is removed.
Figure 3:
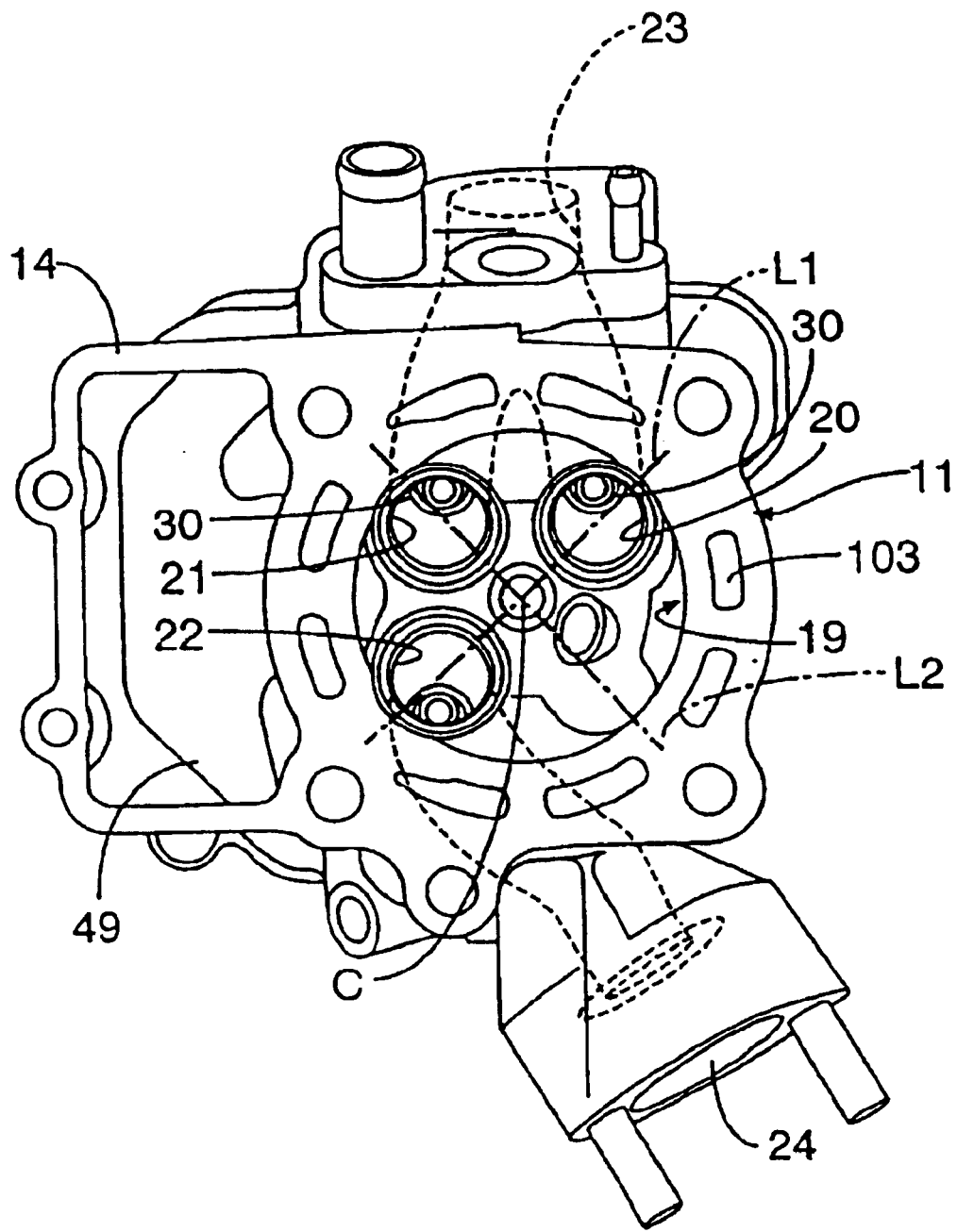
FIG. 3 is a drawing of a cylinder head taken along the line 3—3 in FIG. 1.

Referring also to FIG. 2 and FIG. 3, the cylinder head 14 includes first and second intake valve ports 20, 21 opening on the ceiling surface of the combustion chamber 19, an air intake port 23 opening on one side of the cylinder head 14 in common communication with the intake valve ports 20, 21, a single exhaust valve port 22 opening on the ceiling surface of the combustion chamber 19, and an exhaust port 24 opening on the other side of the cylinder head 14 in communication with the exhaust valve port 22, wherein an injector 25 for injecting fuel directly into the combustion chamber 19 together with compressed air is placed on the axis of the cylinder bore 16, that is, on the cylinder axis C and attached thereto.

The first intake valve port 20 and the exhaust valve port 22 are disposed on both sides of the aforementioned cylinder axis C with the injector 25 projecting on the plane intersecting the cylinder axis C, and the second intake valve port 21 being disposed on one side of the cylinder axis C. The injector 25 is positioned on one straight line L2 substantially orthogonal to another straight line L1 that connects the first intake valve port 20 and the exhaust valve port 22. An ignition plug 26 is mounted to the cylinder head 14 so as to be exposed in the combustion chamber 19 at the position avoiding interference with the first intake valve port 20, the second intake valve port 21, and the exhaust valve port 22.

The cylinder head 14 includes first and second intake valves 27, 28 that can open and close the first and second intake valve ports 20, 21 respectively provided so as to be capable of an opening and closing movement. An exhaust valve 29 that can open and close the exhaust valve port 22 is provided so as to be capable of an opening and closing movement. The first and second intake valves 27, 28 are slidably fitted into guide cylinders 30 . . . that are secured to the cylinder head 14 respectively. Valve springs 32 . . . are provided between retainer 31 . . . fixed respectively to the upper ends of both of the intake valves 27, 28 projecting from the guide cylinders 30 . . . and the cylinder head 14, respectively. Both of the intake valves 27, 28 are urged in the closing direction by a spring force exerted by the valve springs 32. . . . The exhaust valve 29 is slidably fitted into a guide cylinder 33, which is secured to the cylinder head 14. A valve spring 35 is provided between a retainer 34 fixed to the upper end of the exhaust valve 29 projecting from the guide cylinder 33 and the cylinder head 14. The exhaust valve 29 is urged into the closing direction by a spring force exerted by the valve spring 35.

Figure 4:
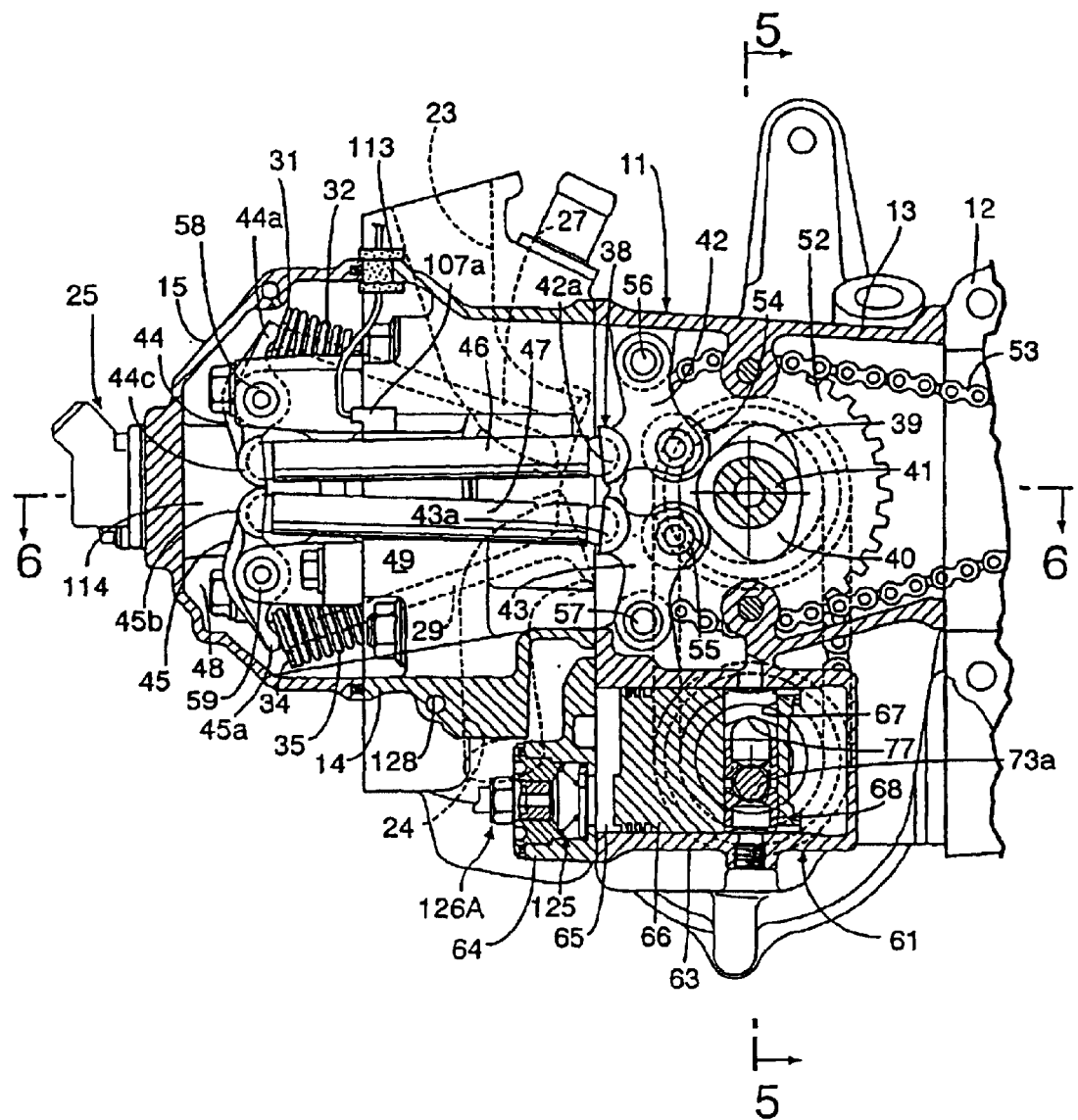
FIG. 4 is a cross sectional view taken along the line 4—4 in FIG. 2.
Figure 5:
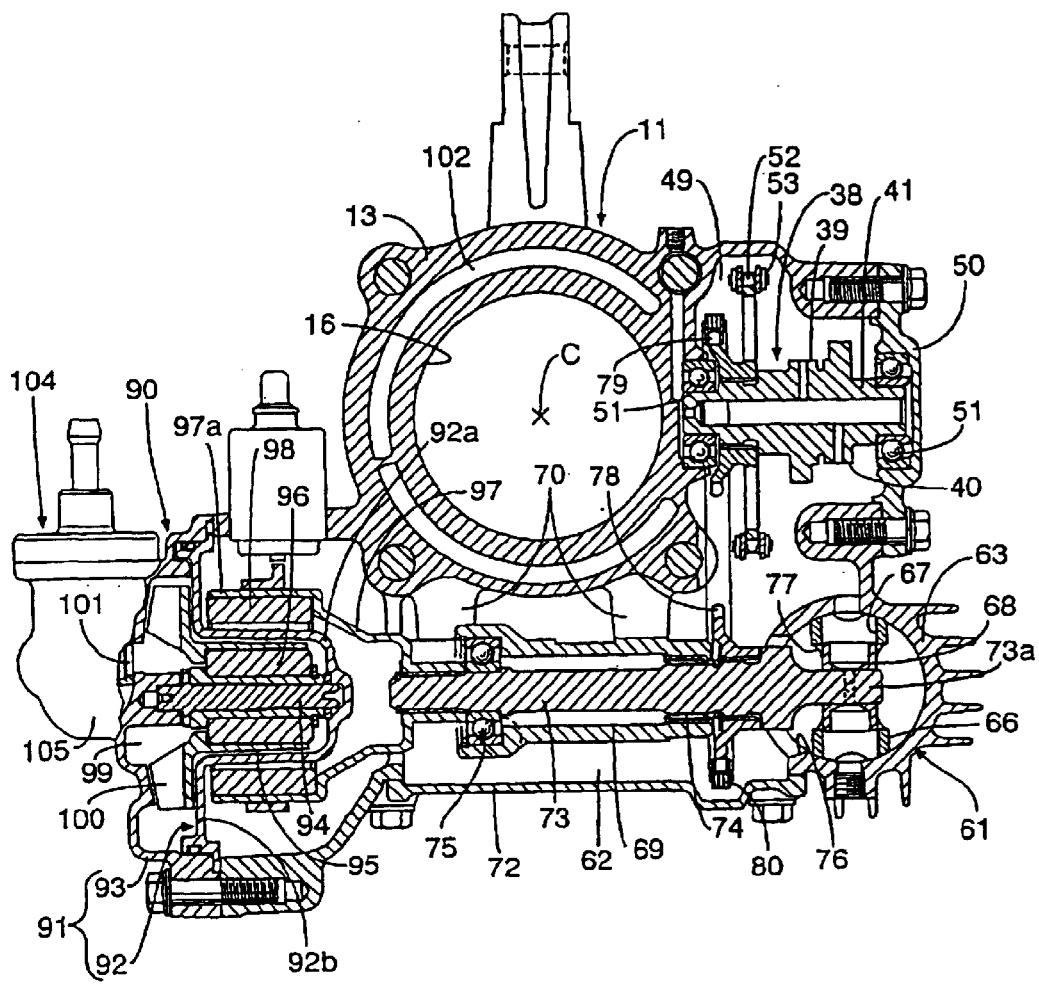
FIG. 5 is a cross sectional view taken along the line 5—5 in FIG. 4.
Figure 6:
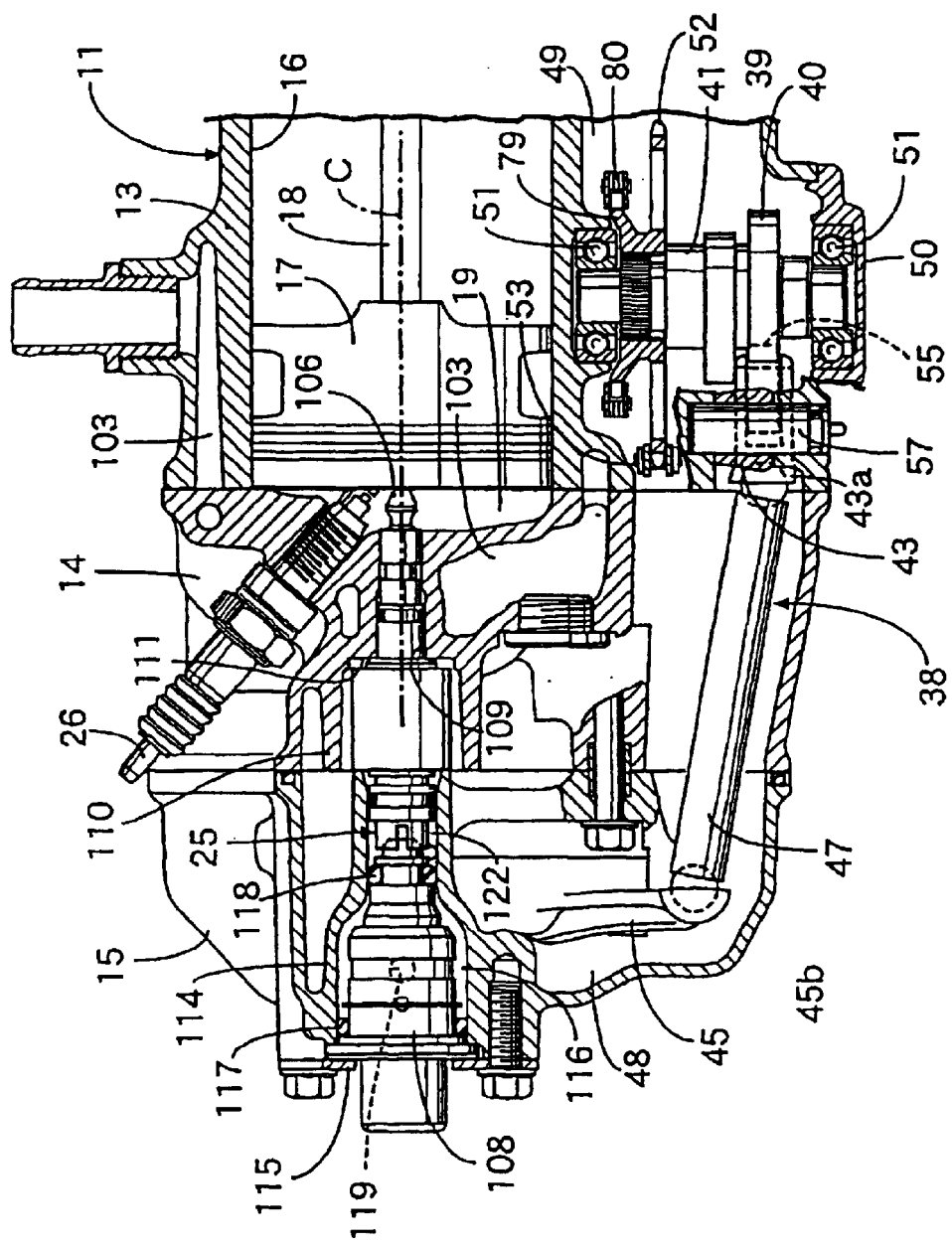
FIG. 6 is a cross sectional view taken along the line 6—6 in FIG. 4.

Referring also to FIG. 4 to FIG. 6, the first and second intake valves 27, 28, and the exhaust valve 29 are opened and closed by a valve gear 38, and the valve gear 38 includes a camshaft 41 that rotates and has an intake-side and exhaust-side cams 39, 40, an intake-side first rocker arm 42 that swings in association with the aforementioned intake-side cam 39, an exhaust-side first rocker arm 43 that swings in association with the aforementioned exhaust-side cam 40, an intake-side second rocker arm 44 having a pair of pressing arms 44a, 44b that come into contact with the upper ends of the first and second intake valves 27, 28, an exhaust-side second rocker arm 45 having a pressing arm 45a that comes into contact with the upper end of the exhaust valve 29, an intake-side push rod 46 provided between the intake-side first and second rocker arms 42, 44 so as to transmit a swinging movement of the intake-side first rocker arm 42 to the intake-side second rocker arm 44, and an exhaust-side push rod 47 provided between the exhaust-side first and second rocker arms 43, 45 so as to transmit a swinging movement of the exhaust-side first rocker arm 43 to the exhaust-side second rocker arm 45.

A first valve chamber 48 for accommodating the upper portions of the intake-side and the exhaust-side second rocker arms 44, 45 and the intake-side and the exhaust-side push rods 46, 47 of the aforementioned valve gear 38 is formed between the cylinder head 14 and the head cover 15. The crankcase 12, the cylinder block 13, and the cylinder head 14 are formed with a second valve chamber 49 in communication with the first valve chamber 48 so as to extends in parallel with the cylinder axis C on the side of the cylinder bore 16.

The camshaft 41 of the valve gear 38 is accommodated and disposed in the second valve chamber 49 so as not to interfere with the first valve chamber 48 between the cylinder head 14 and the head cover 15, both ends of the camshaft 41 having an axis parallel with the crankshaft are rotatably supported in the cylinder block 13 and a cover 50 secured to the cylinder block 13 so as to form the outer surface of the second valve chamber 49 via ball bearings 51, 51.

A first driven sprocket 52 is connected to a camshaft 41 so as not to be capable of relative rotation, and a cam chain 53 for reducing the speed of rotational power from the crankshaft by 1/2 and transmitting to the cam shaft 41 is wound around the first driven sprocket 52.

The intake-side and exhaust-side first rocker arms 42, 43 have rollers 54, 55 that come into rolling contact with the intake-side and exhaust-side cams 39, 40 from above, respectively. The intake-side and exhaust-side first rocker arm 42, 43 have axes parallel with the aforementioned cam shaft 41 and are swingably supported by the intake-side and exhaust-side first rocker shafts 56, 57 provided between the cylinder block 13 and the cover 50. The intake-side and exhaust-side first rocker arms 42, 43 are integrally provided with upwardly opening bowl-shaped pressing portions 42*a*, 43*a* at the position above the aforementioned rollers 54, 55, respectively.

On the other hand, in the first valve chamber 48, the intake-side and exhaust-side second rocker shafts 58, 59 including axes parallel with the aforementioned camshaft 41 are supported by the cylinder head 14 so as to be disposed on both sides of the aforementioned injector 25. The intake-side second rocker arm 42 includes a pair of bifurcated pressing arms 44*a*, 44*b* that are swingably supported by the intake-side rocker shaft 58. The exhaust-side second rocker arm 43 is swingably supported by the exhaust-side rocker shaft 59.

The intake-side second rocker arm 44 is integrally provided with a downwardly opened bowl-shaped pressure receiving portion 44*c* on the side opposite from both of the pressing arms 44*a*, 44*b* with respect to the intake-side second rocker shaft 58, and the exhaust-side second rocker arm 45 is integrally provided with a downwardly opened bowl-shaped pressure receiving portion 45*b* on the side opposite from the pressing arm 45*a* with respect to the exhaust-side second rocker shaft 59.

The intake-side and exhaust-side push rods 46, 47 extends vertically between the second valve chamber 49 and the first valve chamber 48, and the lower spherical ends of the intake-side and exhaust-side push rods 46, 47 are swingably fitted into the pressing portions 42*a*, 43*a* of the intake-side and exhaust-side first rocker arms 42, 43. The upper spherical ends of the intake-side and exhaust-side push rods 46, 47 are swingably fitted into the pressure receiving portions 44*c*, 45*b* of the intake-side and exhaust-side second rocker arms 44, 45.

In the valve gear 38 as described above, the intake-side push rod 46 moves vertically as a result of vertical swinging movement of the intake-side first rocker arm 42 via the intake-side cam 39 in response to the rotation of the camshaft 41, to which rotational power is transmitted from the crankshaft at a speed reducing ratio of 1/2. Correspondingly, the intake-side second rocker arm 44 swings, and hence the first and second intake valves 27, 28 are opened and closed. On the other hand, the exhaust-side push rod 47 moves vertically as a result of a vertical swinging movement of the exhaust-side first rocker arm 43 via the exhaust-side cam 40. Correspondingly, the exhaust-side second rocker arm 45 swings and thus the exhaust valve 29 is opened and closed.

The injector 25 is supplied with compressed air from a compressed air pump 61, and the compressed air pump 61 is disposed on the side of the cylinder block 13 corresponding to the exhaust port 24 provided on the cylinder head 14. In addition, the cylinder block 13 is formed with an operation chamber 62 disposed on the side of the cylinder bore 16 so as to communicate with the aforementioned second valve chamber 49 in substantially an L-shape on a plane orthogonal to the cylinder axis C. The aforementioned compressed air pump 61 is disposed at the connecting portion between the second valve chamber 49 and the operating chamber 62.

Figure 7:
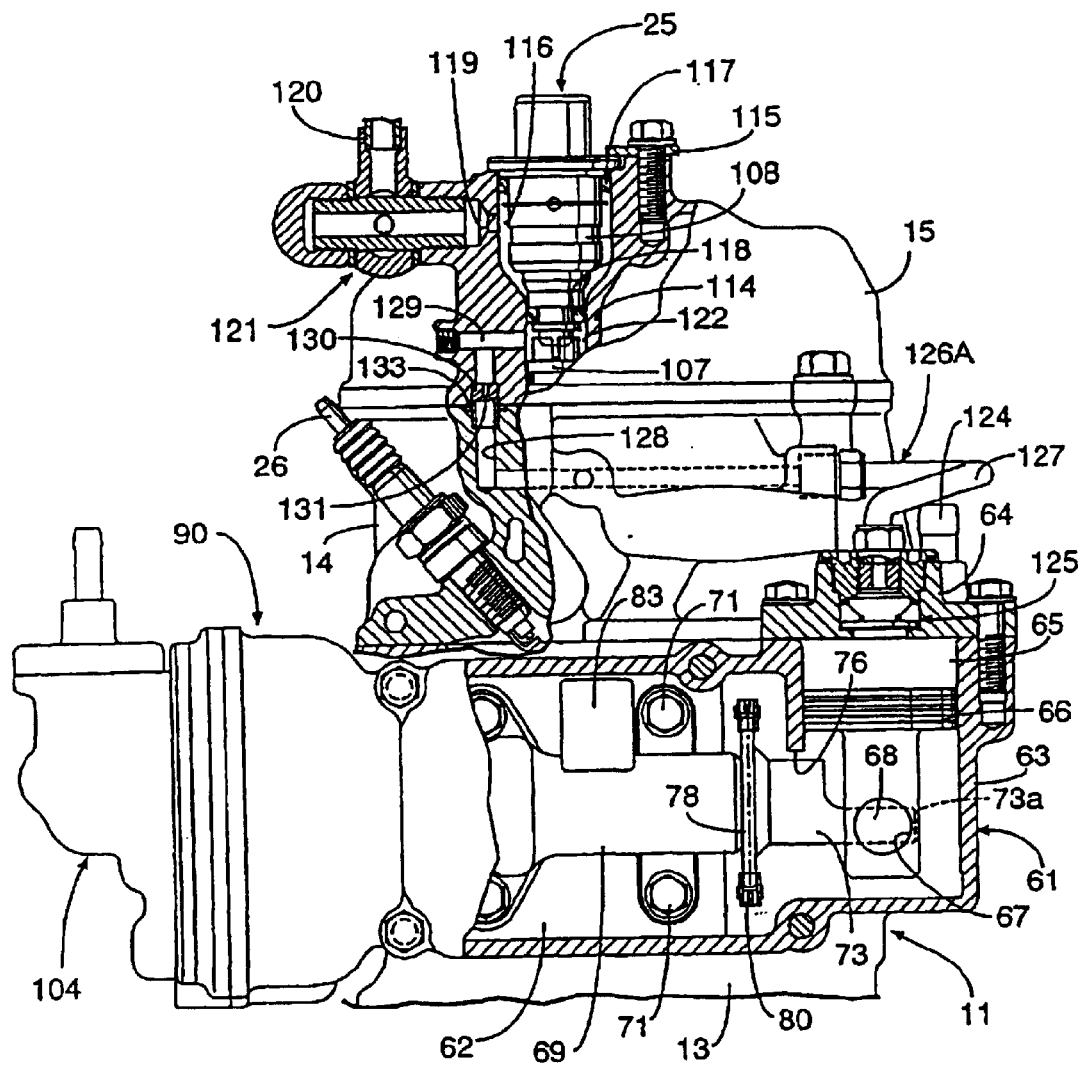
FIG. 7 is a vertical cross sectional side view of the engine taken along the line 7—7 in FIG. 2.

Referring also to FIG. 7, a pump case 63 of the compressed air pump 61 has an axis that is parallel with the cylinder axis C, and is formed integrally with the cylinder block 13 into a cylindrical shape opened on the cylinder head 14 side and closed at the bottom. A lid member 64, for hermetically closing the opening on the aforementioned cylinder head 14 side of the pump case 63, is secured to the cylinder block 13. In addition, the pump case 63 is slidably fitted with a piston 66 that defines a pump chamber 65 with respect to the aforementioned lid member 64.

The piston 66 is provided with a sliding hole 67 laying along a rectilinear diameter thereof and having an axis passing through the axis of the aforementioned camshaft 41, and the sliding hole 67 is slidably fitted with a sliding piece 68. On the other hand, a cylindrical bearing member 69 having an axis parallel with the axis of the aforementioned camshaft 41 and passing through the axis of the aforementioned piston 66 is disposed in the operating chamber 62, and the bearing member 69 is secured to a plurality of, for example, four, securing bosses 70 . . . projecting from the cylinder block 13 by bolts 71 . . . respectively. In addition, a cover 72 defining the outer side surface of the operating chamber 62 is secured to the cylinder block 13, and the aforementioned bolts 71 . . . may be tightened and loosened when the cover 72 is opened.

A revolving shaft 73 is coaxially inserted into the aforementioned bearing member 69, and a roller bearing 74 is interposed between one end of the bearing member 69 and the revolving shaft 73, and a ball bearing 75 is interposed between the other end of the bearing member 69 and the revolving shaft 73. In other words, the revolving shaft 73 is rotatably supported by the bearing member 69 that is secured to the cylinder block 13.

An eccentric shaft 73*a* is integrally provided at one end of the revolving shaft 73 projecting from one end of the aforementioned bearing member 69 at an eccentric position thereof, and the distal end of the eccentric shaft 73*a* is connected to the aforementioned sliding piece 68. Therefore, the eccentric shaft 73*a* rotates about the axis of the revolving shaft 73 in accordance with the rotation of the revolving shaft 73, and hence the piston 66 slides in the pump case 63 so as to increase and decrease the volume of the pump chamber 65.

Therefore, the pump case 63 is formed with an opening 76 through which an end of the revolving shaft 73 is inserted, and the piston 66 is formed with an insertion hole 77, which allows insertion of the eccentric shaft 73*a* so as to be capable of moving in the direction along the axis of the sliding hole 67 in accordance with the rotation of the revolving shaft 73, in communication with the longitudinal center of the sliding hole 67.

A second driven sprocket 78 is fixed to one end of the revolving shaft 73 at the position between the pump case 63 and the bearing member 69, an endless chain 80 is wound around a drive sprocket 79 formed integrally with the first driven sprocket 52, around which the cam chain 53 is wound, and the aforementioned second driven sprocket 78, so that the revolving shaft 73, that is, the compressed air pump 61 is rotated by power transmitted from the aforementioned camshaft 41.

Through holes 81, 82 are formed on both ends of the bearing member 69 at the center between the ball bearing 75 and the roller bearing 74, respectively. The bearing member 69 is integrally formed with an oil guide 83 for guiding part of the oil dropped into the operating chamber 62 to the area between the bearing member 69 and the revolving shaft 73, at a position corresponding to one through hole 81. In other words, an oil return passage 84 formed on the cylinder head 14 for guiding oil from the first valve chamber 48 is formed on the cylinder head 14, and an oil return passage 85 in communication with the oil return passage 84 and opening into the operating chamber 62 is formed in the cylinder block 13. The oil guide 83 is integrally formed on the bearing member 69 so as to guide oil that is dropped from the oil return passage 85 to the through hole 81. Part of the oil introduced into the area between the bearing member 69 and the revolving shaft 73 is used for lubricating the roller bearing 74 and the ball bearing 75, and the remaining oil drops downwardly into the operating chamber 62 through the through hole 82. Oil accumulated on the bottom of the operating chamber 62 is returned to the crankcase 12 through an oil return passage 86 formed in the cylinder block 13 in communication with the lower portion of the operating chamber 62.

The cylinder block 13 is attached to a water pump 90 having an axis of rotation coaxial with the revolving shaft 73 on the side opposite from the compressed air pump 61 with respect to the aforementioned bearing member 69. A pump housing 91 of the water pump 90 includes a housing body 92 having a dish-shaped portion 92b formed integrally with the opened end of a bottomed cylindrical portion 92a, which is closed on the side of the revolving shaft 73, and a pump cover 93 for closing the opened end of the housing body 92. The pump cover 93 is secured to the cylinder block 13 so as to clamp the outer periphery of the opened end of the housing body 92 with the cylinder block 13.

Both ends of a pump shaft 94, which is coaxial with the revolving shaft 73, are rotatably supported at the center of the closed end of the bottomed cylindrical portion 92a and at the center of the pump cover 93. A plurality of magnets 96 . . . are adhered to a rotor 95 that is inserted into the bottomed cylindrical portion 92a so as to be capable of rotating integrally with the pump shaft 94. On the other hand, a rotating member 97 having a cylindrical portion 97a that coaxially encloses the bottomed cylindrical portion 92a of the aforementioned housing body 92 is fixed to the other end of the revolving shaft 73 projecting from the other end of the bearing member 69. A plurality of magnets 98 . . . are adhered on the inner surface of the aforementioned cylindrical portion 97a. Accordingly, when the rotating member 97 rotates together with the revolving shaft 73, the rotor 95 rotates with the pump shaft 94.

A whirl chamber 99 is formed between the housing body 92 and the pump cover 93. An impeller 100 stored in the whirl chamber 99 is provided on the rotor 95.

The pump cover 93 is formed with a plurality of intake ports 101 . . . opening toward the center of the whirl chamber 99, and cooling water introduced into the whirl chamber 99 from the intake ports 101 . . . are pressurized by rotation of the impeller 100. Therefore, cooling water discharged from the water pump 90 is supplied through a block-side water jacket 102 formed in the cylinder block 13 and a head-side water jacket 103 formed in the cylinder head 14 in communication with the block-side water jacket 102. Therefore, a state in which cooling water discharged from the head-side water jacket 103 is guided into the radiator and the like, not shown, and a state in which cooling water bypasses the radiator or the like and returns to the intake ports 101 . . . may be switched by a thermostat 104 in accordance with the temperature of cooling water. The thermostat housing 105 of the thermostat 104 is integrally formed on the pump cover 93 of the aforementioned water pump 90.

With reference to FIG. 6, the injector 25 includes an air fuel injection valve 107 having a nozzle 106 plunged into the combustion chamber 19 and being mounted to the cylinder head 14, and a fuel injection valve 108 connected to the air fuel injection valve 107 so as to inject fuel into the air fuel injection valve 107 from behind. The air fuel injection valve 107 injects fuel directly into the combustion chamber 19 with compressed air.

The cylinder head 14 is formed with a fitting hole 109 for hermetically fitting the aforementioned nozzle 106, and an insertion cylinder 110 being in communication coaxially with the fitting hole 109 and having an inner diameter larger than the fitting hole 109 so as to be coaxial with the cylinder axis C. The nozzle 106 of the air fuel injection valve 107 is hermetically fitted into the fitting hole 109, and inserted into a insertion cylinder 110 until it abuts against an annular shoulder 111 formed between the fitting hole 109 and the insertion cylinder 110. In addition, a conductor connecting portion 107a provided on the rear portion of the air fuel injection valve 107 is disposed at a notch 110a formed at the rear end of the insertion cylinder 110. A pair of conductors 112 . . . are drawn from the conductor connecting portion 107a outside the insertion cylinder 110 and out through a grommet 113 clamped at the mating surface between the cylinder head 14 and the head cover 15.

On the other hand, the head cover 15 is integrally formed with a cylindrical injector housing 114 for fitting and holding the fuel injection valve 108 and clamping the aforementioned air fuel injection valve 107 with the cylinder head 14. The distal end of the injector housing 114 abuts against the rear end of the air fuel injection valve 107 when the head cover 15 is connected to the cylinder head 14.

An annular combustion chamber 116 that communicates with the interior of the fuel injection valve 108 is formed between the injector hosing 114 and the fuel injection valve 108. A pair of sealing members 117, 118 that clamps the combustion chamber 116 from both sides are interposed between the fuel injection valve 108 and the injector housing 114.

The head cover 15 is directly provided with a fuel supply passage 119 that communicates with the aforementioned combustion chamber 116. A hose 120 that guides fuel from a fuel supply source, not shown, is connected to the fuel supply passage 119 via a joint 121.

An annular air chamber 122 that communicates with the interior of the air fuel injection valve 107 is formed between the distal end of the fuel injection valve 108 and the rear end of the air fuel injection valve 107 and the injector housing 114, and compressed air from the aforementioned compressed air pump 61 is supplied into the air chamber 122.

With regard to FIG. 2 and FIG. 7, an intake duct 124, to which a hose for guiding air from an air cleaner, not shown, is connected, is provided on the lid member 64 of the compressed air pump 61, and the intake duct 124 is connected to the pump chamber 65 via a lead valve (not shown) built in the lid member 64.

A lead valve 125 that opens in accordance with increase an pressure in the pump chamber 65 is built in the aforementioned lid member 64, and compressed air discharged from the compressed air pump 61 is supplied into the air chamber 122 via the aforementioned lead valve 125 and a compressed air supply route 126A.

The compressed air supply route 126A includes a tube member 127 that is connected to the lid member 64 so as to communicate with the aforementioned lead valve 125 at one end and to the cylinder head 14 at the other end, a passage 128 that is directly provided in the cylinder head 14 so as to communicate with the tube member 127, and a passage 129 directly formed in the head cover 15 so as to communicate with the passage 128 and to communicate with the air chamber 122.

Part of the passage 128 that is directly formed in the cylinder head 14 passes the air in the vicinity of the exhaust port 24. Especially in the vicinity of the exhaust port 24, the head-side water jacket 103 is disposed between the exhaust port 24 and the cylinder block 13, while the aforementioned passage 128 passed along the side opposite from the aforementioned head-side water jacket 103 with respect to the exhaust port 24.

Both ends of a knock pin 130 that extends across the mating surface between the cylinder head 14 and the head cover 15 is inserted into the cylinder head 14 and the head cover 15. The passages 128, 129 directly provided in the cylinder head 14 and the head cover 15 for constituting part of the compressed air supply route 126A are brought into communication with each other via the aforementioned knock pin 130. An O-ring 133 that encloses the knock pin 130 is interposed between the cylinder head 14 and the head cover 15 at the mating surface thereof.

An orifice 131 is formed in the knock pin 130. A relief valve 132 is connected to the aforementioned passage 128 and is formed upstream of the orifice 131 and is mounted to the cylinder head 14.

The operation of the first embodiment will now be described. Since at least part of the compressed air supply route 126A for supplying compressed air to the injector 25, that is, part of the passage 128 that is directly formed in the cylinder head 14 and constitutes part of the compressed air supply route 126A, passes the area in the vicinity of the exhaust port 24, compressed air flowing through the compressed air supply route 126A can be warmed up by exhaust heat of exhaust gas flowing through the exhaust port 24. Thus, the volume of compressed air increases. As a consequence, the pumping efficiency is improved.

In addition, in the vicinity of the exhaust port 24, while part of the head-side water jacket 103 is disposed between the exhaust port 24 and the cylinder block 13, the passage 128 constituting part of the aforementioned compressed air supply route 126A is disposed on the side opposite from the head-side water jacket 103 with respect to the exhaust port 24. Therefore, cooling by the head-side water jacket 103 may be prevented from affecting compressed air that passes through the compressed air supply route 126A as much as possible. Thus, a high pumping efficiency may be maintained even when the engine is a water-cooled engine.

The compressed air pump 61 connected to the compressed air supply route 126A is disposed on the side of the cylinder block 13 corresponding to the exhaust port 24. Thus, the compressed air pump 61 may be disposed in the space for arranging the engine including the exhaust pipe that is connected to the exhaust port 24. In addition, since the pump case 63 of the compressed air pump 61 is formed integrally with the cylinder block 13, the number of the components may be reduced, and simultaneously, an increase in the size of the engine and the complexity of the structure of the engine in the vicinity of the compressed air pump 61 may be avoided.

The fuel injection valve 108 of the injector 25 is fitted into and held by the injector housing 114. Since the injector housing 114 is formed integrally with the head cover 15, it is not necessary to arrange a member constituting the injector housing 114 around the cylinder head 14. Thus, the number of components may be reduced, and simultaneously, an increase in the size of the engine and the complexity of the structure around the engine may be avoided.

Since the fuel supply passage 119 for supplying fuel and compressed air to the injector housing 114 and the passage 129 that is at least part of the compressed air supply route 126A are directly formed in the head cover 15, it is not necessary to arrange a duct line or the like for supplying fuel and compressed air to the injector housing 114 around the injector housing 114. Thus, the number of components may be reduced, and simultaneously, an increase in size of the engine and the complexity of the structure around the engine may be avoided.

The camshaft 41, which constituting part of the valve gear 38 that drives the first intake valve 27 and the second intake valve 28 disposed on the cylinder head 14 and the exhaust valve 29, is disposed on the side of the cylinder block 13 while avoiding an interference with the portion between the cylinder head 14 and the head cover 15. Therefore, the arrangement of the camshaft 41 between the cylinder head 14 and the head cover 15 may be avoided. Thus, the flexibility of layout of the injector housing 114 increases, and the flexibility of layout of the fuel supply passage 119 and the passage 129 that are directly formed in the head cover 15.

In addition, the injector 25 is disposed on the cylinder axis C, the first intake valve port 20 and the exhaust valve port 22 are disposed on both sides of the aforementioned injector 25 projecting on the plane intersecting the cylinder axis C. The second intake valve port 21 is disposed on one side of the injector 25 on the straight line L2 substantially orthogonal to a straight line L1 that connects the first intake valve port 20 and the exhaust valve port 22. Therefore, by arranging the injector 25 at the center of the combustion chamber 19, variations in the fire propagation distance in the combustion chamber 19 may be avoided and hence the combustion efficiency may be improved. In addition, by providing the first and second intake valve ports 20, 21, an improvement in the air filling efficiency and a reduction of pumping loss may be achieved. Furthermore, the ignition plug 26 may be disposed while easily avoiding interference with the two intake valves 27, 28 and the single exhaust valve 29 so that the ignition plug 26 can be disposed in close vicinity to the injector 25 to improve combustion efficiency.

The air fuel injection valve 107 of the injector 25 is supported by the head cover 15. The passage 129, which is at least part of the compressed air supply route 126A for supplying compressed air to the air fuel injection valve 107, is provided directly in the head cover 15. Therefore, the arrangement of the components for guiding compressed air to the injector 25 around the head cover 15 may be avoided. Thus, an increase in the size of the engine and the complexity of the structure around the engine may be avoided.

The both ends of the cylindrical knock pin 130 extending across the mating surface between the cylinder head 14 and the head cover 15 are inserted into the cylinder head 14 and the head cover 15. The passages 128, 129, which constitute at least part of the compressed air supply route 126A and provided directly on the cylinder head 14 and the head cover 15, respectively, are brought into communication with each other via the knock pin 130. Therefore, even when the relative positions of the cylinder head 14 and the head cover 15 are fixed by the knock pin 130, and the injector 25 is supported by the head cover 15 and the cylinder head 14 cooperatively, an excessive stress is not exerted to the injector 25. In addition, it is also possible to use the knock pin 130 as a connecting member for the passage 128 of the cylinder head 14 and the passage 129 of the head cover 15 to avoid the necessity of a specific component for the connecting passages, which contributes to a reduction in the number of components.

Since the orifice 131 is formed in the knock pin 130, the pressure of compressed air supplied to the injector 25 may be adjusted. In addition, a specific component for adjusting the pressure is not necessary. Therefore, the number of components may be reduced.

Figure 8:
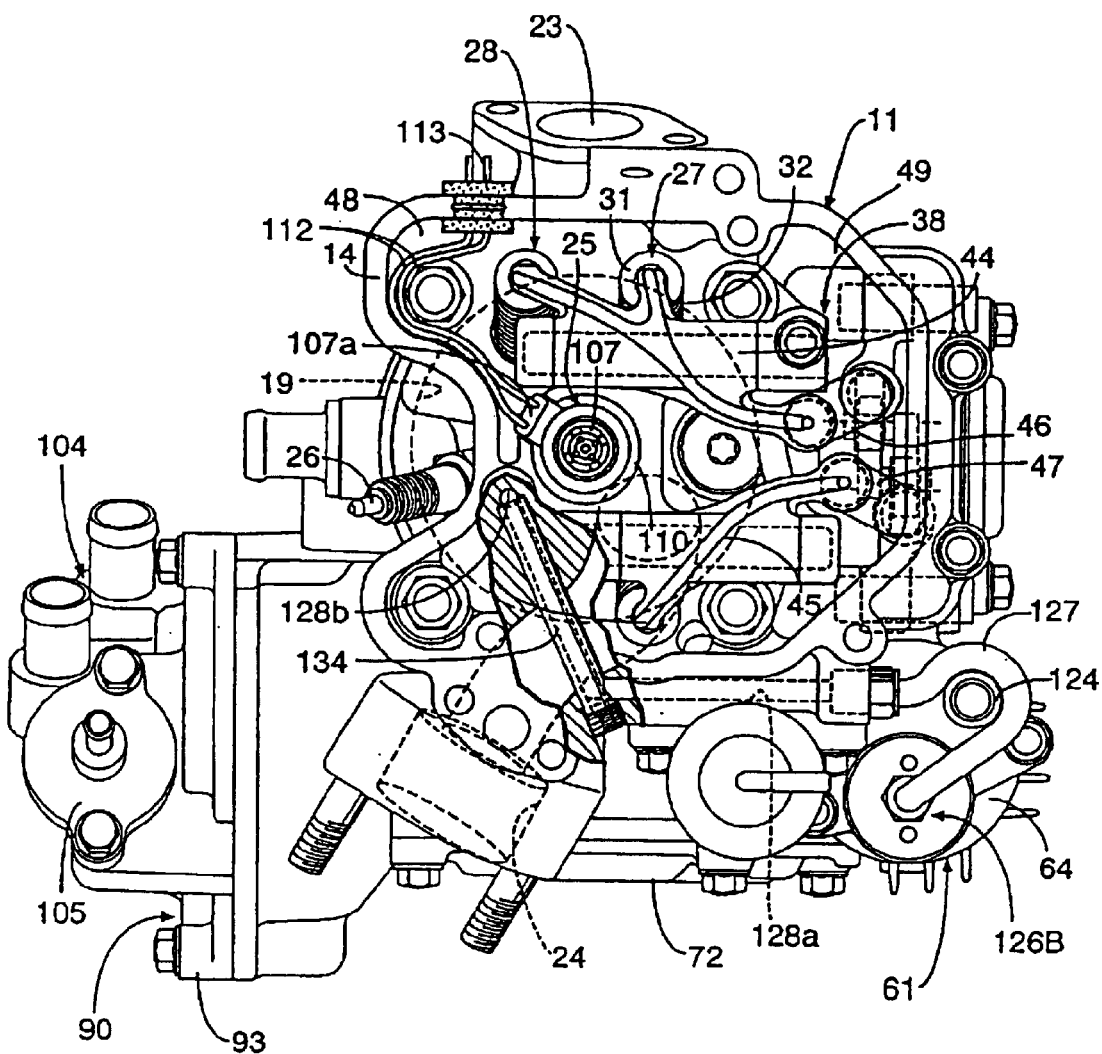
FIG. 8 is a partly exploded view of a second embodiment, corresponding to FIG. 2.

FIG. 8 shows a second embodiment of the present invention with the same reference numerals designating the corresponding parts.

The compressed air supply route 126B for supplying compressed air to the injector 25 includes the tube member 127 that is connected to the lid member 64 at one end so as to communicate with the aforementioned lead valve 125 and to the cylinder head 14 at the other end. A passage 128a is provided directly on the cylinder head 14 so as to communicate with the tube member 127. A cylindrical regulator 134 is mounted to the cylinder head 14 so as to pass through the exhaust port 24 and communicate with the aforementioned passage 128a. A passage 128b is provided directly in the cylinder head 14 so as to communicate with the regulator 134, and the passage 129 (see the first embodiment) provided directly in the head cover 15 so as to communicate with the passage 128b.

According to the second embodiment as well, it is possible to warm up compressed air flowing through the compressed air supply route 126B by exhaust heat of exhaust gas flowing the exhaust port 24. Thus, the volume of compressed air may be increased, thereby improving pumping efficiency. In addition, an increase in the size of the engine and the complexity of the structure around the engine may be avoided by not arranging the components for introducing compressed air to the injector 25 around the cylinder head 14 and the head cover 15.

Although the embodiments of the present invention has been described thus far, the present invention is not limited to the aforementioned embodiments, and various modification in design may be made without departing the present invention stated in claims.

As described above, according to the present invention, since at least part of a compressed air supply route is provided directly on a cylinder head, it is not necessary to arrange a component for introducing compressed air to an injector around the cylinder head. Thus, an increase in the size of the engine and the complexity of the structure around the engine may be avoided. In addition, compressed air flowing in the compressed air supply route may be warmed up by exhaust heat. Thus, the pumping efficiency may be improved by increasing the volume of compressed air.

According to the present invention, at least part of the compressed air supply route for supplying the compressed air to the injector includes a tubular regulator that passes through an exhaust port and a passage that is directly attached to the cylinder head. Therefore, an increase in the size of the engine and the complexity of the structure around the engine may be avoided by not arranging the component for introducing compressed air to the injector around the cylinder head. In addition, compressed air flowing through the compressed air supply route may be warming up by exhaust heat, and the pumping efficiency may be improved by increasing the volume of compressed air.

According to the present invention, cooling by a head-side water jacket may be prevented from affecting compressed air that passes through the compressed air supply route as much as possible. Thus, a high pumping efficiency may be maintained even when the engine is a water-cooled engine.

According to the present invention, a compressed air pump may be disposed in the space for arranging the engine including an exhaust pipe that is connected to the exhaust port.

Furthermore, according to the present invention, the number of the components may be reduced. Thus, an increase in the size of the engine and the complexity of the structure of the engine in the vicinity of the compressed air pump may be avoided.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. An engine fuel injection apparatus including an injector having a fuel injection valve for injecting fuel and an air fuel injection valve that is mounted to a cylinder head so as to inject fuel directly to a combustion chamber together with compressed air, comprising:
   at least part of a compressed air supply route for supplying compressed air to said injector is provided directly on the cylinder head so as to pass in close proximity to an exhaust port;
   a head cover attached to the cylinder head, the head cover being formed with another part of the compressed air supply route; and
   a knock pin extending across a matins surface of the cylinder head and the head cover,
   wherein the part of the compressed air supply route on the cylinder head communicates with the another part of the compressed air supply route in the head cover through an orifice provided in the knock pin.

2. The engine fuel injection apparatus according to claim 1, wherein a head-side water jacket is formed in the cylinder head so as to be arranged between the exhaust port and a cylinder block in the vicinity of said exhaust port and part of said compressed air supply route is directly provided on the cylinder head on the side opposite from said head-side water jacket with respect to the exhaust port.

3. The engine fuel injection apparatus according to claim 1, wherein a compressed air pump to be connected to said compressed air supply routes is disposed on the side of the cylinder block corresponding to said exhaust port.

4. The engine fuel injection apparatus according to claim 2, wherein a compressed air pump to be connected to said compressed air supply routes is disposed on the side of the cylinder block corresponding to said exhaust port.

5. The engine fuel injection apparatus according to claim 3, wherein a pump case of said compressed air pump is formed integrally with the cylinder block.

6. The engine fuel injection apparatus according to claim 4, wherein a pump case of said compressed air pump is formed integrally with the cylinder block.

7. The engine fuel injection apparatus according to claim 1, further comprising an O-ring interposed between the cylinder head and the head cover at the mating surface thereof and enclosing the knock pin.

8. An engine fuel injection apparatus including an injector having a fuel injection valve for injecting fuel and an air fuel injection valve that is mounted to a cylinder head so as to inject fuel directly to a combustion chamber together with compressed air comprising:
   at least part of a compressed air supply route for supplying the compressed air to said injector includes a tubular regulator that passes through an exhaust port and is mounted to the cylinder head and passages that are directly attached to said cylinder head.

9. The engine fuel injection apparatus according to claim 8, wherein a compressed air pump to be connected to said compressed air supply routes is disposed on the side of the cylinder block corresponding to said exhaust port.

10. The engine fuel injection apparatus according to claim 9, wherein a pump case of said compressed air pump is formed integrally with the cylinder block.

11. An engine fuel injection apparatus comprising:

an injector having a fuel injection valve for injecting fuel and an air fuel injection valve, said injector being mounted to a cylinder head for injecting fuel directly to a combustion chamber together with compressed air; and a compressed air supply route for supplying compressed air to said injector, at least part of said compressed air supply route being mounted in close proximity to an exhaust port for heating said compressed air immediately prior to being supplied to said injector;

a head cover attached to the cylinder head, the head cover being formed with another part of the compressed air supply route; and a knock pin extending across a mating surface of the cylinder head and the head cover, wherein the part of the compressed air supply route on the cylinder head communicates with the another part of the compressed air supply route in the head cover through an orifice provided in the knock pin.

12. The engine fuel injection apparatus according to claim 11, wherein a head-side water jacket is formed in the cylinder head so as to be arranged between the exhaust port and a cylinder block in the vicinity of said exhaust port and part of said compressed air supply route is directly provided on the cylinder head on the side opposite from said head-side water jacket with respect to the exhaust port.

13. The engine fuel injection apparatus according to claim 11, wherein a compressed air pump to be connected to said compressed air supply routes is disposed on the side of the cylinder block corresponding to said exhaust port.

14. The engine fuel injection apparatus according to claim 12, wherein a compressed air pump to be connected to said compressed air supply routes is disposed on the side of the cylinder block corresponding to said exhaust port.

15. The engine fuel injection apparatus according to claim 13, wherein a pump case of said compressed air pump is formed integrally with the cylinder block.

16. The engine fuel injection apparatus according to claim 14, wherein a pump case of said compressed air pump is formed integrally with the cylinder block.

17. The engine fuel injection apparatus according to claim 11, further comprising an O-ring interposed between the cylinder head and the head cover at the mating surface thereof and enclosing the knock pin.

* * * * *